(12) United States Patent
Safadi

(10) Patent No.: US 6,883,050 B1
(45) Date of Patent: Apr. 19, 2005

(54) OPTIMIZED POD MODULE/HOST INTERFACE

(75) Inventor: Reem Safadi, Horsham, PA (US)

(73) Assignee: General Instrument Corporation, Horsham, PA (US)

( * ) Notice: Subject to any disclaimer, the term of this patent is extended or adjusted under 35 U.S.C. 154(b) by 537 days.

(21) Appl. No.: 09/925,362

(22) Filed: Aug. 9, 2001

(51) Int. Cl.[7] ............................................. G06F 13/00
(52) U.S. Cl. ........................... 710/100; 710/113; 710/7
(58) Field of Search ................................. 710/100, 113, 710/7, 71; 709/217, 218, 219, 226, 227, 231, 206

(56) References Cited

U.S. PATENT DOCUMENTS

| | | | | |
|---|---|---|---|---|
| 4,447,871 A | * | 5/1984 | Terada et al. | 709/231 |
| 5,144,663 A | * | 9/1992 | Kudelski et al. | 380/230 |
| 5,721,815 A | * | 2/1998 | Ottesen et al. | 345/721 |
| 6,298,400 B1 | * | 10/2001 | Candelore | 710/71 |
| 6,516,445 B1 | * | 2/2003 | Genovese | 714/821 |

* cited by examiner

*Primary Examiner*—Tim Vo
(74) *Attorney, Agent, or Firm*—Steven L. Nichols; Ronald P. Kananen; Rader, Fishman & Grauer PLLC

(57) ABSTRACT

An interface between a point of deployment (POD) module and a host device, such as a set-top terminal for cable television selectively integrates the POD module and the host such that th POD module and host act as having a unified functional architecture by allowing shared memory and direct memory access between the POD module and the host. The selective integration can occur via an interface pin or by functionally reconfiguring a pre-established pin layout in the interface.

18 Claims, 2 Drawing Sheets

OPTIMIZED POD MODULE/HOST INTERFACE

BACKGROUND OF THE INVENTION

1. Field of the Invention

The present invention is directed to component interfaces, and more particularly to an interface for coupling a point of deployment (POD) module to a host device.

2. Description of the Related Art

Various electronic devices use terminals for receiving data and controlling user access to data. One common use for terminals is in advanced subscription television systems, where each subscriber is provided with a set-top terminal containing electronic equipment connecting the subscriber's television or other electronic equipment with a service provider's television system, such as a cable or satellite system. This provides the subscriber with access to dozens or even hundreds of different programming channels as well as the option to access additional services such as premium channels, pay-per-view programming, video-on-demand programming and the Internet. The set-top terminal processes the signal received from the service provider to deliver selected services to each subscriber.

As service providers offer expanded premium services, companies have offered more sophisticated security techniques to ensure that only subscribers who have paid for the premium services have access to them. One device that has been developed for providing conditional access is a removable, replaceable security point-of-deployment (POD) module that can be installed into the set-top terminal, which acts as a host device. The POD module permits conditional access of restricted services to paying subscribers while providing security against unauthorized signal reception. In one embodiment, the POD module is provided by the service provider to paying subscribers and installed in a host port in the set-top terminal.

As certain applications have led to incorporating functionalities from an integrated terminal into a segregated POD module/host configuration, many of the terminal functions are partitioned between the POD module and the host, leading to inefficient implementation. Any data transfer between the POD module and the host requires conforming with a layered set of protocols, causing relatively slow and inefficient data sharing and forwarding. Further, current systems rigidly delineate and segregate the POD module and host functions, making it difficult to transfer the integrated terminal functions into a segregated POD module/host environment.

There is a need for a more efficient structure that allows a POD module/host structure to function as a unified device.

SUMMARY OF THE INVENTION

Accordingly, the present invention is directed to an apparatus for providing a function to a host terminal, comprising a point of deployment (POD) module that can be connected to the host and an interface between the POD module and the host, wherein the interface selectively integrates the POD module and the host such that the POD module and host act as a unified architecture.

The invention is also directed to a method for providing a function to a host terminal, comprising the steps of connecting a point of deployment (POD) module to a host via an interface and selectively integrating the POD module and the host such that the POD module and host act as having a unified functional architecture.

DETAILED DESCRIPTION OF THE EMBODIMENTS

Figure 1:
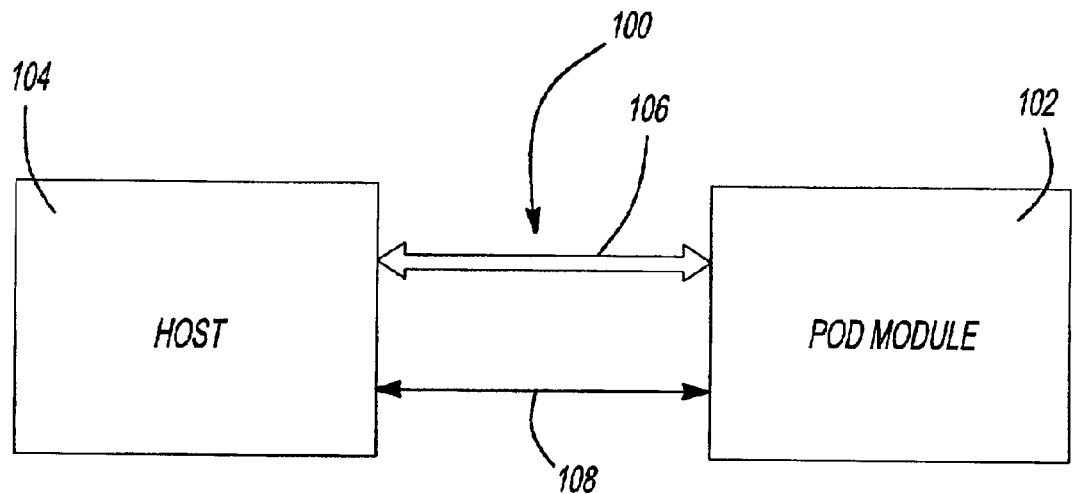
FIG. 1 is a representative diagram of a POD module coupled to a host according to one embodiment of the present invention.

FIG. 1 is a block diagram representing one embodiment of an optimized interface 100 between a point of deployment (POD) module 102 and a host 104 according to one embodiment of the present invention. The POD module 102 and host 104 can be connected together using any known means, such as a standard interface as defined by OpenCable(tm), which is based on the National Renewable Security Standard (NRSS-B). The interface 100 selectively integrates the POD module 102 and the host 104 so that the POD module 102 and host 104 act as a unified architecture by, for example, allowing direct memory access (DMA) and data transfer between the POD module 102 and host 104 through a reconfigured interface 106. The DMA transfer can involve, for example, allowing the POD module 102 to access a memory in the host 104 rather than conducting data transfer through cumbersome protocol stacks. This allows faster, more efficient data sharing and forwarding between the POD module 102 and host 104.

Although the POD module 102 and host 104 are still physically separate components the DMA transfer and/or shared memory enabled by the reconfigured interface 106 creates a unified functional architecture, allowing many functions, such as applications and associated security functions, to operate as if the POD module 102 and the host 104 are a single unit. This prevents any problems in functions, such as authentication and authorization of code objects, that would otherwise be adversely affected by the normal functional partitioning between the POD module 102 and the host 104 in a standard, established interface 108. By selectively overriding the separation between the POD module 102 and the host 104, the invention functionally integrates the POD module 102 and the host 104, simplifying transfer of integrated terminal functions into a POD module/host environment.

The interface 100 includes a plurality of pins (101). The pin configuration in the interface 100 can be any functional configuration and can be used as address/data bus lines between the POD module 102 and the host 104. To provide the DMA function between the POD module 102 and host 104 one of the pins (103) in the interface 100 can act as an interface pin or a DMA pin. Note that some standard interfaces, such as the NRSS-B interface, includes one or more reserved pins that are normally functionally inactive. These reserved pins in the standard established interface 108 can be selectively used by the invention as DMA pins in the configured interface 106 to integrate the POD module 102 and the host 104. Alternatively, the pins can have an established functional pin layout that is selectively changed to a reconfigured functional pin layout to allow DMA transfer and/or shared memory access to occur between the POD module 102 and the host 104. In this case, the pins would have dual functions, with a first function assigned by a standard established functional pin layout acting as the established interface 108 and the second function, such as a DMA transfer function or a shared memory function, provided by a reconfigured functional pin layout acting as the reconfigured interface 106.

The selective reconfiguration can be triggered when the POD module 102 and the host 104 interface for the first time. More particularly, when the POD module 102 initially connects with the host 104, the POD module 102 checks the identity of the host 104 to determine whether the host 104 is an authorized host (e.g., whether the host 104 is manufactured by a recognizable manufacturer that supports the reconfiguration feature) and, if the host 104 is an authorized host, activates the reconfiguration. The actual detection process can be based on an identifier that the host 104 provides the POD module 102 and that is based on the standard set of transactions defined by any known standard, such as that specified by OpenCable(tm). The POD module 102 can then determine based on the identifier whether the reconfiguration feature may be activated. As a practical matter, a manufacturer that is manufacturing both POD modules 102 and hosts 104 may implement the authorization feature, or a set of host manufacturers may agree to the implementation.

In one embodiment, the integration function would occur only if the host 104 is an authorized host. For example, if the POD module 102 is connected to a non-authorized host 104, the interface 100 between the POD module 102 and the host operates in a conventional manner as defined by the standard, established interface 108. In the case of an established functional pin layout, for example, the pins will remain in the established functional pin layout if the POD module 102 is connected to a non-authorized host 104. Similarly, if the established pin layout has a reserved, functionally inactive pin that is used selectively to integrate the POD module 102 and the host 104, the reserved pin will remain functionally inactive if the host is a non-authorized host 104.

If the POD module 102 is connected to an authorized host 104, such as a host 104 made by the same manufacturer as the POD module 102, the interface 100 can be switched on demand from the established interface 108 to the reconfigured interface 106. In the case of a pin layout having an established functional configuration, for example, the interface 100 will switch from the established functional pin layout 108 to the reconfigured functional pin layout 106 to integrate the POD module 102 and host 104. Similarly, in an interface, such as an NRSS-B interface, having one or more reserved pins in the established interface 108, connecting the POD module 102 to an authorized host 104 switches the reserved pins to DMA pins in the reconfigured interface 106 to functionally integrate the POD module 102 and host 104.

Figure 2:
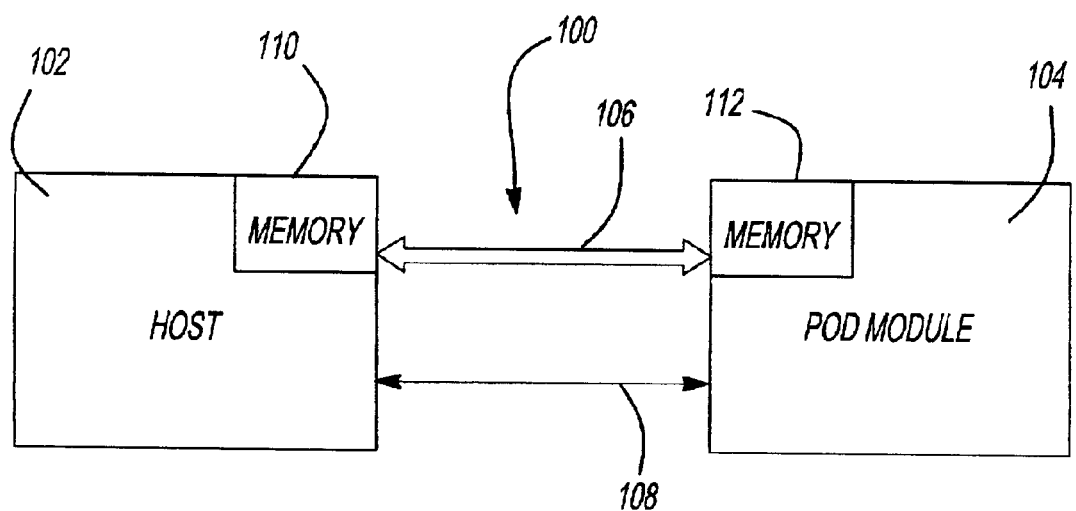
FIG. 2 is a representative diagram of another embodiment of the present invention.

FIG. 2 illustrates another embodiment of the present invention. FIG. 2 shows a first memory 110 in the host 102 and a second memory 112 in the POD module 102. The invention does not require both memories 110, 112 and can operate with only one of the memories without departing from the scope of the invention. The reconfigured interface 106 allows sharing of the two memories 110, 112 when the POD module 102 and host 104 are integrated together. In other words, regardless of where the memory 110, 112 is specifically located, the shared memory function provided by the reconfigured interface 108 allows the POD module 102 and host 104 to access the same memory. As noted above, functional integration between the POD module 102 and the host 104 may enable shared memory access as well as DMA transfer. As an example, the shared memory allows the POD module 104 to share the host's memory 110 burden for memory-intensive POD module functions by providing its own host accessible memory 112 rather than requiring all of the needed memory to reside entirely on the host 104 or entirely on the POD module 102.

Figure 3:
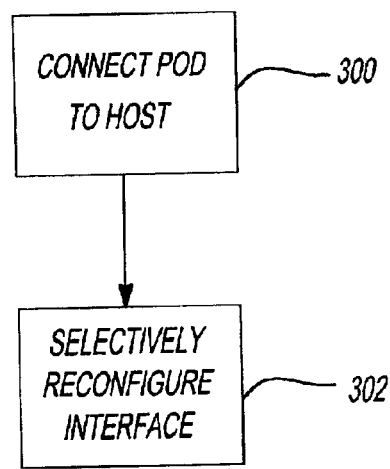
FIG. 3 is a flow diagram of one method according to the present invention.
Figure 4:
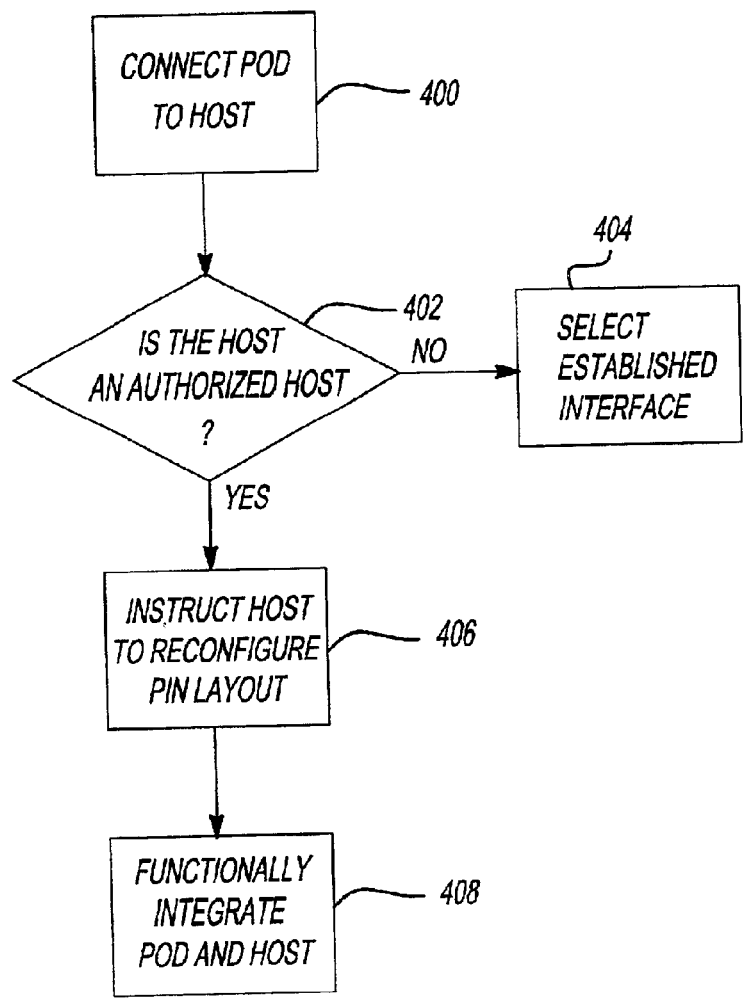
FIG. 4 is another flow diagram illustrating another method according to the present invention.

FIGS. 3 and 4 are flowcharts illustrating embodiments of a method according to the claimed invention. As shown in FIG. 3, one embodiment of the inventive method includes the steps of connecting the POD module to the host at step 300 and selectively reconfiguring the interface between the POD module and host at step 302 to form a functionally unified architecture. FIG. 4 illustrates another possible method that involves connecting the POD module 102 to the host 104 at step 400 and checking whether the host is an authorized host at step 402. If the host 104 is not an authorized host, the POD module 102 and host 104 remain functionally separate and operate normally at step 404 via the standard, established interface 108. If the POD module determines that the host 104 is an authorized host, the POD module 102 requests the host 104 to reconfigure the pin layout at step 406. The host 104 then reconfigures the functional pin layout at step 408, generating the reconfigured interface 106 allowing the functional integration between the host 104 and the POD module 102 to take effect.

As a result, the integrated POD module/host interface creates a unified functional architecture that is facilitated by a shared memory and/or DMA between the physically separate POD module and the host. The unified architecture provided by the invention avoids the inefficiencies encountered when, for example, functions performed on an integrated terminal are adapted to a segregated POD module/host environment. Further, the invention can maintain the security features provided by the POD module/host environment without sacrificing other functionalities due to the separate POD module and host components.

While the invention has been specifically described in connection with certain specific embodiments thereof, it is to be understood that this is by way of illustration and not of limitation, and the scope of the appended claims should be construed as broadly as the prior art will permit.

What is claimed is:

1. An apparatus for providing a function to a host terminal, comprising:
    a point of deployment (POD) module that can be connected to the host; and
    an interface between the POD module and the host, wherein the interface selectively integrates the POD module and the host;
    wherein the interface includes a plurality of pins coupling the POD module to the host, and wherein at least one pin is allocated as an interface pin for integrating the POD module and the host.

2. The apparatus of claim 1, wherein the interface pin is a reserved pin on an NRSS-B interface.

3. The apparatus of claim 1, wherein the plurality of pins has an established functional pin layout that is changed to a reconfigured functional pin layout to integrate the host and the POD module.

4. The apparatus of claim 1, wherein the interface pin is a dual functionality pin that is switchable between an established pin function and a reconfigured pin function that integrates the POD module and the host.

5. The apparatus of claim 3, wherein the functional reconfiguration enables at least one of shared memory and direct memory access between the host and the POD module.

6. The apparatus of claim 4, wherein the reconfigured pin function allows at least one of shared memory and direct memory access between the host and the POD module.

7. An apparatus for providing a function to a host terminal, comprising:

a memory;

a point of deployment (POD) module that can be connected to the host; and a plurality of pins connecting the POD module to the host, wherein at least one of said plurality of pins is allocated as an interface pin that selectively integrates the POD module and host to allow the POD module and the host to share the memory and to allow direct memory access between the POD module and the host.

8. The apparatus of claim 7, wherein the memory includes a first memory portion in the POD module and a second memory portion in the host.

9. The apparatus of claim 7, wherein the interface pin selectively integrates the POD module and the host by selectively reconfiguring the functions of a selected number of said plurality of pins.

10. The apparatus of claim 7, wherein the interface pin integrates the POD module and the host if the host has a given characteristic, and wherein the interface pin does not integrate the POD module and the host if the host does not have the given characteristic.

11. The apparatus of claim 7, wherein the interface pin is a reserved pin on an NRSS-B interface.

12. The apparatus of claim 7, wherein the interface pin is a dual functionality pin that is switchable between a standard function and an integration function that integrates the POD module and the host.

13. The apparatus of claim 10, wherein the given characteristic indicates that the host is an authorized host.

14. A method for providing a function to a host terminal, comprising the acts of:

connecting a point of deployment (POD) module to the host via an interface; and selectively integrating the POD module and the host such that the POD module and host act as a unified architecture;

wherein the interface includes a plurality of pins coupling the POD module to the host, and wherein the selectively integrating act includes the act of allocating at least one pin as an interface pin for integrating the POD module and the host.

15. The method of claim 14, wherein the plurality of pins has an established functional pin layout, and wherein the selectively integrating act includes the act of functionally reconfiguring the established functional pin layout to obtain a reconfigured functional pin layout.

16. The method of claim 14, wherein the interface pin is a dual functionality pin, and wherein the selectively integrating act includes the act of switching the dual functionality pin between an established function and a reconfigured function that integrates the POD module and the host.

17. The method of claim 15, wherein the functional reconfiguration act enables at least one of shared memory and direct memory access between the host and the POD module.

18. The apparatus of claim 16, wherein the reconfigured function allows at least one of shared memory and direct memory access between the host and the POD module.

* * * * *